United States Patent [19]
Lu et al.

[11] Patent Number: 5,764,324
[45] Date of Patent: Jun. 9, 1998

[54] FLICKER-FREE REFLECTIVE LIQUID CRYSTAL CELL

[75] Inventors: Minhua Lu, Mohegan Lake; Kei-Hsiung Yang, Katonah, both of N.Y.

[73] Assignee: International Business Machines Corporation, Armonk, N.Y.

[21] Appl. No.: 787,411

[22] Filed: Jan. 22, 1997

[51] Int. Cl.$^6$ .................. G02F 1/1335; G02F 1/1343
[52] U.S. Cl. .................................. 349/113; 349/147
[58] Field of Search .................. 349/25, 113, 147

[56] References Cited

U.S. PATENT DOCUMENTS

| | | | |
|---|---|---|---|
| 4,470,669 | 9/1984 | Kubota et al. | 349/105 |
| 4,761,058 | 8/1988 | Kubota et al. | 349/38 |
| 5,075,796 | 12/1991 | Schildkraut et al. | 359/247 |
| 5,115,336 | 5/1992 | Schlidkraut et al. | 359/263 |
| 5,157,541 | 10/1992 | Schildkraut et al. | 385/4 |

*Primary Examiner*—Anita Pellman Gross
*Attorney, Agent, or Firm*—Jay P. Sbrollini

[57] ABSTRACT

A reflective liquid crystal cell for AMLCDs is provided wherein the reflective electrode may be passivated with an insulating film such as silicon oxide. In addition, the liquid crystal cell of the present invention may include a conducting transparent electrode that has a work function substantially equal to the work function of the reflective electrode in the cell. The reflective electrode may include a transparent conductive layer such as ITO, or may include an integer number of film pairs, wherein the film pair comprises a first dielectric film having a low index of refraction and a second dielectric film having a high index of refraction.

13 Claims, 7 Drawing Sheets

FLICKER-FREE REFLECTIVE LIQUID CRYSTAL CELL

BACKGROUND OF THE INVENTION

1. Field of the Invention

The present invention relates to reflective-type liquid crystal cells which are typically driven by active matrices.

2. Related Art

There are transmissive-type and reflective-type active-matrix-driven liquid crystal displays (AMLCDs). The basic structure of the transmissive-type AMLCD as shown in FIG. 1 consists of polarizers 101 and 102, glass substrates 103 and 104, transparent conductive electrodes 105 and 106, a color filter 108 (optional), on/off transistor switch 109, and a liquid crystal (LC) medium 110 sandwiched between two transparent conductive electrodes 105 and 106. A back-light source 107 illuminates the display panel from below. An alignment layer (not shown) such as rubbed polyimide films is typically disposed between the LC medium 110 and the transparent conductive electrodes 105 and 106. The transmissive type AMLCD typically consists of repetitive unit cell or picture element (Pel). FIG. 1 illustrates a 3 by 3 matrix of pels.

The schematic drawing of a pel is shown in FIG. 2, where the attached numbers have correspondingly the same meanings as in FIG. 1. The capacitor 111 denotes the capacitance of the LC medium 110 sandwiched between two transparent conductive electrodes 105 and 106. The capacitor 120 denotes a storage capacitance which provides a parallel capacitance to the LC capacitance 111 and which is terminated on a line 121 common to all the storage capacitors in the display. Another alternative design for the storage capacitor is the storage capacitor 122 disposed between the electrode 106 and the gate bus line 107.

When a voltage below a threshold voltage is applied on the gate line 107, the transistor 109 is in the off-condition so that the potentials on the data bus line 108 and electrode 106 are isolated from one another. When a voltage larger than a threshold voltage is applied on the gate bus line 107, the transistor 109 is in an on-condition (low impedance state), thereby allowing the voltage on the data bus line 108 to charge the electrode 106. The voltage applied to the data bus line 108 may vary such that there are different voltages applied to the electrode 106. Varying the voltage to the electrode 106 is used to control the liquid crystal cell 111 such that different amounts of light are transmitted across the liquid crystal, thus resulting in the display of a gray scale of light.

A reflective-type AMLCD is similar in structure to the transmissive-type AMLCD; however, the transparent conductive electrode 106 is usually replaced by a reflective metal electrode which usually occupies a larger area to cover the transistor 109. Also for reflective-type AMLCDs, there is no need for the back-light source 107. Instead, ambient light or other light source illuminates the display panel from the top.

There are several materials such as indium oxide, zinc oxide, tin oxide, and indium-tin oxide (ITO) can be used for the transparent electrodes of the transmissive-type and reflective-type AMLCDs. ITO is the preferred choice because of good transparency in the visible light, suitable conductivity, and inexpensive in process. Another advantage of ITO electrode is its inert to the LC medium and the LC alignment layer.

In transmissive-type AMLCDs, both electrodes 105 and 106 may be composed of ITO. In this scenario, the ITO electrodes do not introduce extra ionizable impurities into the LC medium to degrade the resistivity of the LC medium. One way to characterize the resistivity of the LC medium is to measure the charge retention of the LC medium between the two electrodes. For the measurement of the charge retention, the storage capacitor 120 (and/or storage capacitor 122) is designed such that it has a negligible capacitance compared to the LC capacitance 111. The transistor 109 is switched on and the LC capacitor 111 is charged up alternatively to ±5 V within about 60 micro-seconds. The transistor 109 is then switched off and the voltage of electrode 106 is measured as a function of time. The decrease of voltage of electrode 106 is caused mainly by the ionizable impurities existing in the LC medium 110. A small decrease of voltage at electrode 106 implies that ITO electrodes 105 and 106 contribute a negligible amount of ionizable impurities into the LC medium 110.

However, for a reflective-type AMLCD, the transparent conductive electrode 106 is replaced by a reflective metal electrode. The transparent electrode 105 typically is formed of ITO, and the reflective electrode 106 is typically formed from aluminum or silver or one of their alloys. In such devices, the charge retention of the reflective LC cell is degraded significantly. This voltage degradation is caused by a substantial amount of ionizable impurities existing within the LC medium 110. Most of these ionizable impurities are due to the reflective electrode which seems to contaminate the adjacent LC medium. Further more, the amount of contamination by the reflective electrode is not uniform across the whole display panel which may cause inaccuracies when displaying gray scale at some locations and perceivable flickers at other locations.

Moreover, in a reflective-type AMLCD, the reflective electrode 106 is made of a different metallic material than that of the transparent conductive electrode 105. Each conductive material has its own work function. The difference in work function of the reflective electrode 106 and the transparent conductive electrode 105 results in perceivable flicker at some locations of the panel. More specifically, the work function of some common conductive material is tabulated in Table I. From Table I, ITO has a work function of 4.7 eV which is different by more than 0.29 eV from the work function of Al. Because the difference in work function of the reflective electrode 106 and the transparent conductive electrode 105 cannot be uniformly balanced out across the LCD panel at a given time, a perceivable flicker at some locations of the panel results.

SUMMARY

The present invention provides a reflective-type AMLCD with higher reflectivity and accuracy in displaying gray scale and with no perceivable flickers across the whole display panel. This invention describes a reflective liquid crystal cell for AMLCDs wherein the reflective electrode may be passivated with an insulating film such as silicon oxide. In addition, the liquid crystal cell of the present invention may include a conducting transparent electrode that has a work function substantially equal to the work function of the reflective electrode in the cell. The reflective electrode may include a transparent conductive layer such as ITO, or may include an integer number of film pairs, wherein the film pair comprises a first dielectric film having a low index of refraction and a second dielectric film having a high index of refraction.

DETAILED DESCRIPTION OF THE PRESENT INVENTION

Figure 1:
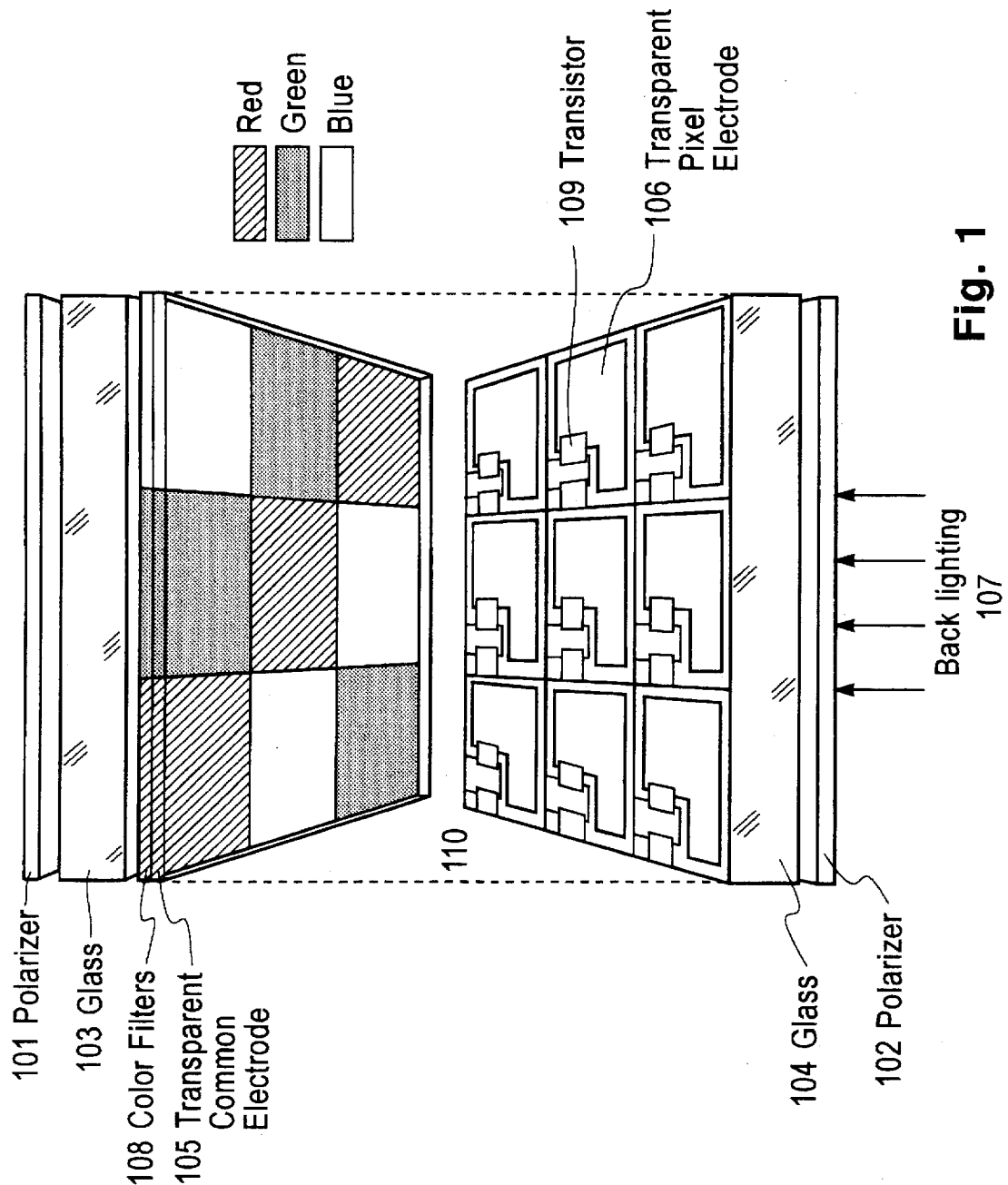
FIG. 1 is a pictorial illustration of a transmissive-type AMLCD.
Figure 2:
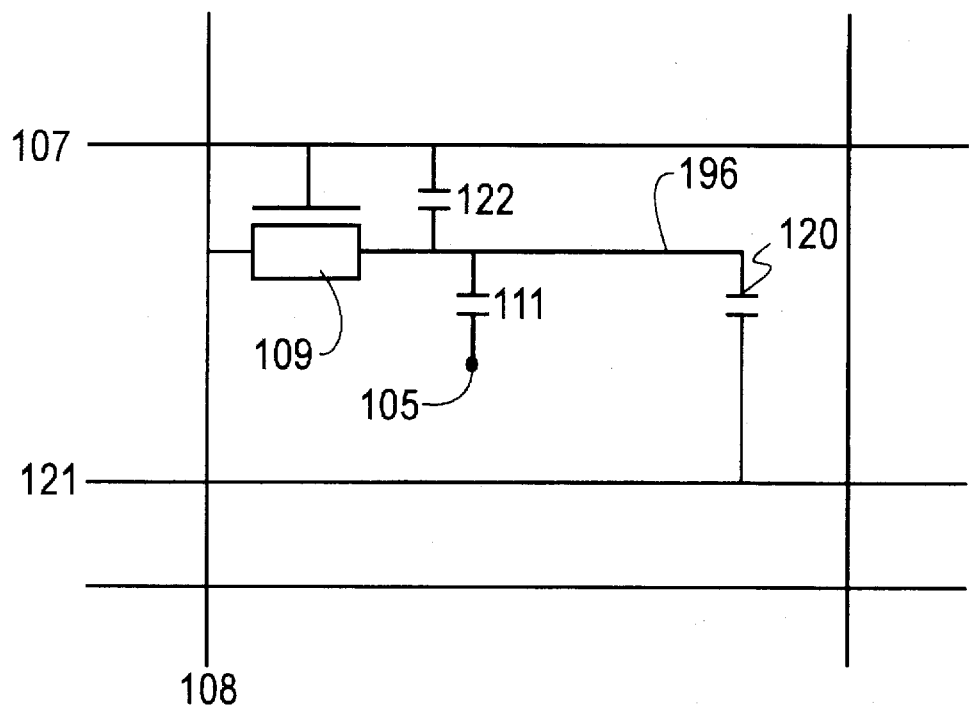
FIG. 2 is a schematic diagram of a picture element (pel) of an AMLCD.
Figure 3A:
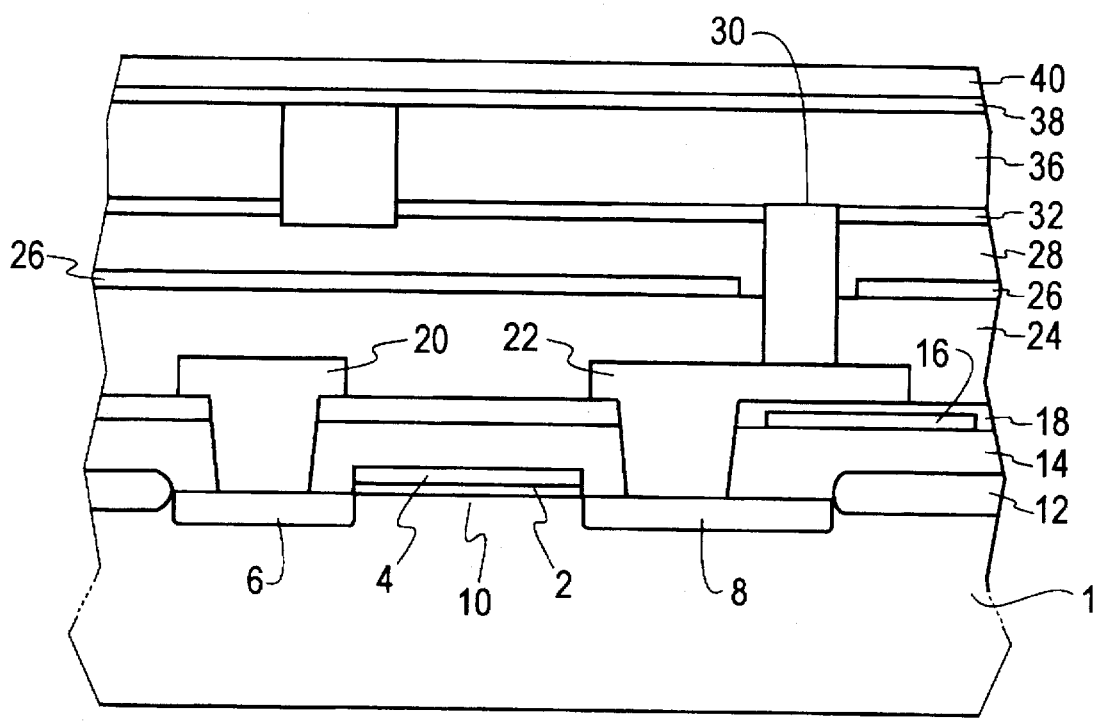
FIG. 3(a) is a cross-sectional view of a sub-pixel of a reflective-type AMLCD.

Referring now to the drawing and, more particularly to FIG. 3(A), there is shown an example of the structure of a reflective-type AMLCD wherein the subject invention may be embodied. It should be noted that the particular structure of the reflective-type AMLCD should not be construed in a limiting sense upon the practice of the invention. The reflective-type AMLCD includes a field effect transistor (FET) that is formed in each of a plurality of regions defined by field oxide films 12 on a substrate 1. The substrate 1 may be semiconductor material such as silicon, a glass material, or a polymeric material. The FET has the following configuration. A gate insulating film 2 is formed on the silicon substrate 1. The gate insulating film 2 preferably comprises a layer of $SiO_2$ 150 to 500 angstrom in thickness. A gate electrode 4 is formed on the gate insulating film 2. The gate electrode preferably comprises a layer of polysilicon 0.44 microns in thickness. A drain region 6 and a source region 8 are formed in those regions of the silicon substrate 1 which are located on both sides of the gate electrode 4. A channel region 10 is formed in the silicon substrate 1 below the gate electrode 4.

An inter-layer insulting film 14, comprising for example silicone oxide, is formed on the resulting structure, and a storage capacity line 16 is formed on the inter-layer insulating film 14. An inter-layer insulating film 18, comprising for example silicon oxide, is formed on the resulting structure. Contact holes are etched in the inter-layer insulating films 14 and 18 to expose the drain regions 6 and source regions 8. A data line 20 and a source line 22 are formed on the inter-layer insulating film 18 and connects to the drain regions 6 and source regions 8, respectively, via the contact holes etched in the insulating films 14 and 18 as shown. Preferably, the data line 20 and source line 22 comprises aluminum (Al) and has a thickness of 0.7 micron.

An inter-layer insulating film 24, comprising for example silicon oxide, is formed on the resulting structure. An optical absorbing layer 26 is then formed on the insulating film 24. The optical absorbing layer 26 preferably comprises a tri-layer structure as follows: a top layer of titanium nitride (TiN) layer, a middle layer of Aluminum (Al), and a bottom layer of titanium (Ti). In this example, the tri-layer structure preferably has as a thickness of 160 nm wherein the bottom titanium (Ti) layer is 100 angstroms in thickness, the middle Al layer is 1000 angstroms in thickness, and the top titanium nitride (TiN) layer is 500 angstroms in thickness. This structure provides an optical absorbing layer having a characteristic wavelength of 380 to 700 angstroms, which prevents light from being transmitted to the TFT with a transmission factor of 0%, and which causes light to reflect with a reflection factor of 25%. Thus, the optical absorbing layer 26 serves to improve the contrast of images and to prevent leakage currents in the FET.

A silicon nitride film 28 is formed on the optical absorbing layer 26. The silicon nitride film 28 preferably has a thickness of 400 to 500 nm. A light reflecting film 32 is formed on the silicon nitride film 28. The light reflecting film 32 preferably comprises aluminum, and has a thickness of 150 nm. The source line 22 and the light reflecting film 32 are connected together via, for example, a tungsten (W) stud 30. The tungsten stud may be formed by forming a hole that penetrates the films 24 and 28, and then depositing the tungsten utilizing, for example, chemical vapor deposition (CVD) techniques, to fill the hole with tungsten. The optical absorbing layer 26 is opened around the tungsten stud 30 so as not to be connected electrically thereto.

The light reflecting film 32 is formed for each of a plurality of FETs. The light reflecting films 32 are spaced apart at a specified interval of, for example, 0.5 to 1.7 microns by pillar-shape spacers 34. The area between spacers constitutes a sub-pixel. The spacers 34 are preferably comprised of $SiO_2$. The spacer height preferably ranges from 1 to 5 microns and determines the desired cell gaps. The spacer 34 is located between the light reflecting films 32 in such a way that it does not rest on the film 32, and has a width almost equal to the distance between the light reflecting films 32. This serves to prevent the numerical aperture of the sub-pixel from decreasing due to the pillar-shape spacer 34. A plurality of spacers 34 may be provided at specified intervals to retain predetermined cell gaps.

A transparent electrode 38 is formed on a glass protect substrate 40. The transparent electrode 38 preferably comprises indium titanium oxide (ITO). The transparent electrode layer 38 is adhered to the pillar-shape spacers 34. A void 36 is formed between the light reflecting film 32 and the opposing electrode 38. The void 36 is filled with a liquid crystal material and sealed. The liquid crystal molecules are preferably oriented by an orienting film (not shown).

Figure 3B:
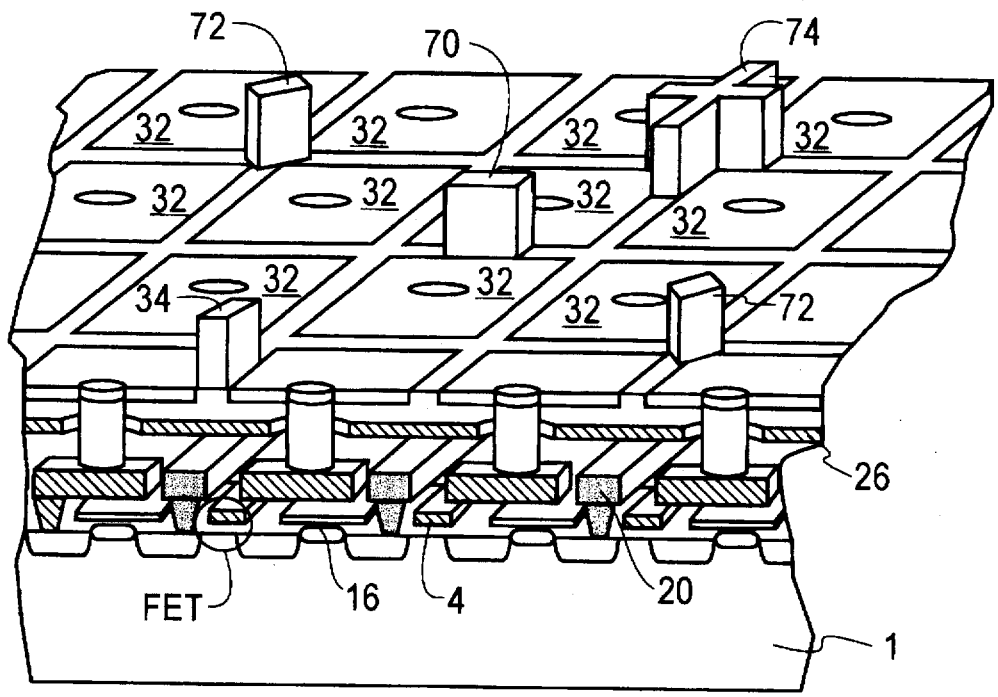
FIG. 3(b) is a pictorial illustration of a matrix of pels of the reflective-type AMLCD.

FIG. 3(b) is a pictorial illustration of a matrix of pels for a reflective-type AMLCD. As shown, the pillar-shape spacers 34 are formed in the regions between the light reflecting films 32 at a specified interval. In this example, the light reflecting film 32 that form the sub-pixels are square shaped with four sides of 17 microns. The sub-pixels are preferably arranged in a matrix of rows and columns as shown. For example, the sub-pixels may be arranged in a matrix of 1,280 rows and 1,600 columns.

The light reflecting film 32 of the reflective-type AMLCD reflects light entering from the glass protect substrate 40 and also functions as a display electrode for applying a voltage to the liquid crystal layer 36. The FET functions as a switching element for applying a signal voltage supplied to the data line 20 to the light reflecting film 32-display electrode when the gate 4 is turned on. The amount of light that is emitted from the sub-pixel is controlled by varying the transmission factor of the cell. More specifically, the transmission factor of the cell controls the amount of light entering from the glass protect substrate 40 that is allowed to transmit through the liquid crystal cell, reflect off the light reflecting film 32, transmit back through the liquid crystal cell and then exit the glass protect substrate 40. The transmission factor of the liquid crystal material is controlled by varying: 1) the direction of liquid crystal molecules (not shown), which is accomplished by varying a voltage supplied to the light reflecting film 32-display electrode when the FET is turned on and 2) the voltage supplied to the opposing electrode 38.

The present invention improves the charge retention of the reflective-type liquid crystal cell.

Figure 4:
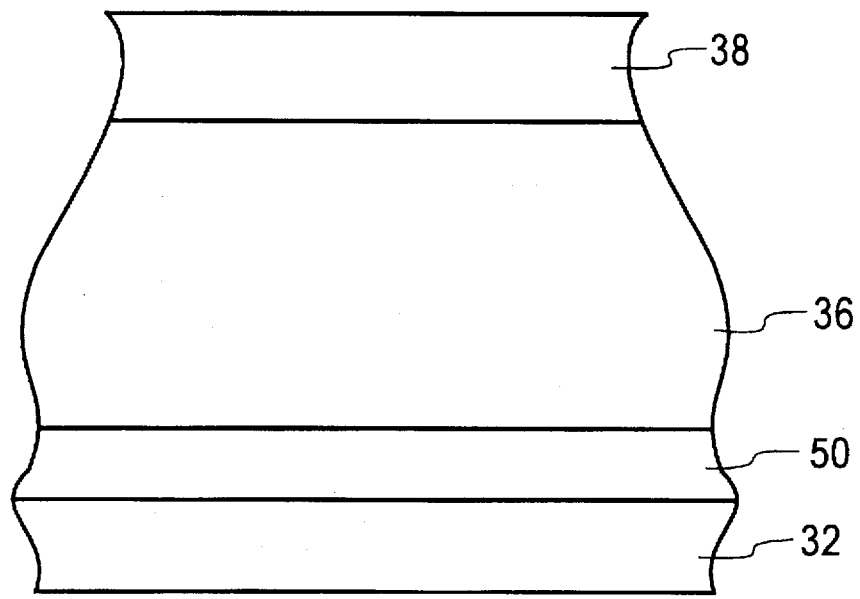
FIG. 4 is a cross-sectional view of the reflective-type AMLCD according to the present invention illustrating the reflecting metal layer and layers adjacent thereto.

According to the first embodiment of the present invention, a passivation layer 50 is formed on the reflecting metal layer 32 and is disposed between the reflecting metal layer 32 and the LC medium 36 as shown in FIG. 4. The passivation layer 50 is preferably a silicon oxide. The reflecting metal layer 32 preferably comprises aluminum (or an aluminum alloy) or silver (or a silver alloy). In the case that the reflecting metal layer 32 comprises aluminum, while depositing the passivation layer 50, the temperature should be less than about 300° C. to reduce the formation of hillocks in the aluminum reflecting layer 32. A silicon oxide passivation layer 50 may be deposited using plasma-enhanced chemical vapor deposition, atmospheric pressure chemical deposition, low pressure chemical vapor deposition, and sputtering. The silicon oxide passivation layer 50 can also be prepared by dipping the substrate into a solution containing such chemical as ethyl-ortho-silicate. The substrate is then withdrawn from the solution and baked at an elevated temperature below about 300° C. to form the silicon oxide passivation layer 50. In addition, the thickness of the silicon oxide passivation layer 50 is preferably between 20 nm to 320 nm thick. A thickness of 79 nm or 267 nm achieves a maximum reflectivity of the cell because it generates a 180° phase shift in the incoming light that cancels the phase change resulting from reflection from the reflecting metal layer 32.

According to the second embodiment of the present invention, the materials for the reflecting metal layer 32 and the opposing electrode 38 are selected such that the work functions of the reflecting metal layer 32 and the opposing electrode 38 are approximately equal. For a reflective-type AMLCD, the material for the reflecting metal layer 32 should be selected such that the reflectivity of the material is as high as possible. In addition, a transparent conductive material must be selected for the opposing electrode 38. Both aluminum and silver and their alloys have high reflectivity and thus may be used for the reflecting metal later 32, and ITO is preferably used for the opposing electrode 38. As shown in Table I, the work function for silver has a wide range (4.36 eV to 4.74 eV) and matches the work function of ITO (4.7 ev). However, silver is relatively unstable and difficult to process. Therefore, it is preferable that Aluminum be used as the reflecting metal layer 32. In this case, the work function of Aluminum is in the range (4.06 eV to 4.41 eV) which is less than the work function of ITO (4.7 eV). As described above in the first embodiment of the present invention, a passivation layer 50 may be formed between the aluminum reflecting layer 32 and the LC medium 36. However, in this scenario, the difference in work function between the aluminum reflecting layer 32 and the ITO electrode 38 exists. Such a difference in work function between the aluminum reflecting layer 32 and the electrode 38 may cause flicker.

In order to make the work function between the aluminum reflecting layer 32 and the electrode 38 approximately equal and thus avoid flicker, one or more layers of transparent conductive material and, possibly, dielectric material may be disposed between the aluminum reflecting layer 32 and the opposing electrode 38.

Figure 5:
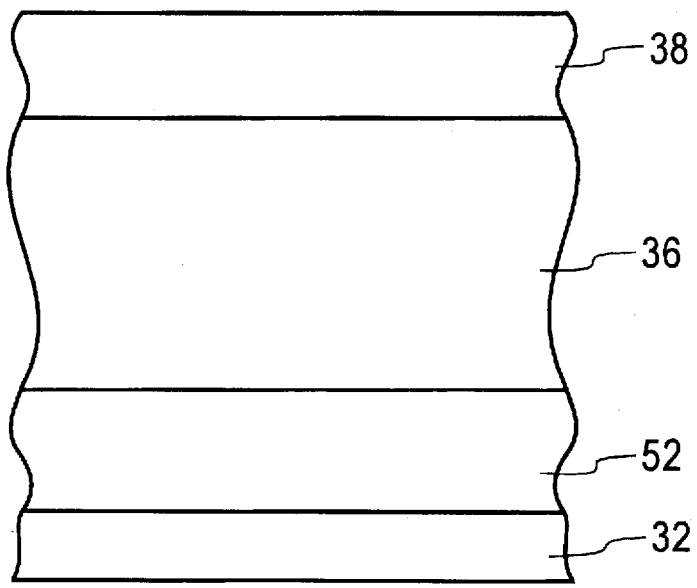
FIG. 5 is a cross-sectional view of the reflective-type AMLCD according to the present invention illustrating the reflecting metal layer and layers adjacent thereto.

For example, as shown in FIG. 5, an ITO layer 52 may be formed on the aluminum reflecting layer 32 and be disposed between the aluminum reflecting layer 32 and the LC medium 36. In this case, the thickness of the ITO layer 52 is preferably chosen to be approximately a half-wave plate for a given incident light. For example, for incident light at a wavelength of 550 nm, the ITO layer 52 is preferably chosen to be 140 nm. A more detailed discussion of a half-wave plate is set forth in American Institute of Physics Handbook, third edition (1972), McGraw-Hill Company, pp. 6-118 to 6-123, herein incorporated by reference in its entirety.

Figure 6:
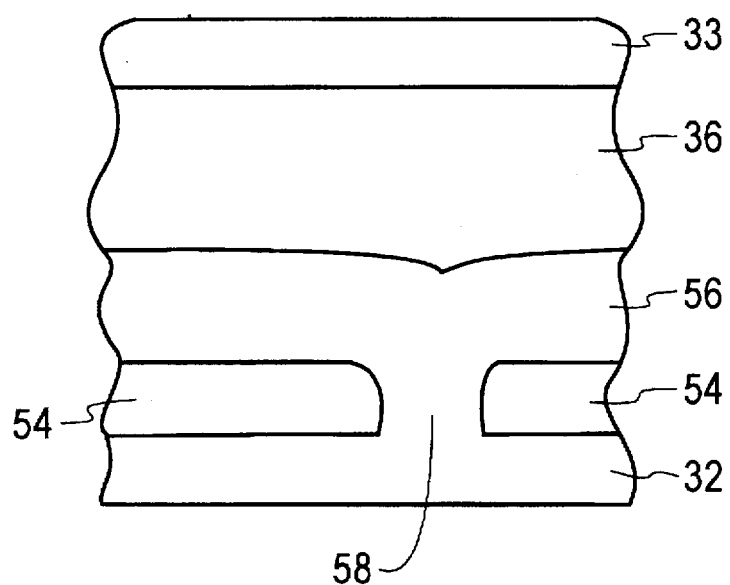
FIG. 6 is a cross-sectional view of the reflective-type AMLCD according to the present invention illustrating the reflecting metal layer and layers adjacent thereto.

In another example, one or more layers of dielectric material and a transparent conductive layer is formed on the reflecting metal layer 32 and disposed between the reflecting metal layer 32 and the LC medium 36. As shown in FIG. 6, a single layer of dielectric material 54 and an transparent conductive layer 56 is formed on the reflecting metal layer 32 and disposed between the reflecting metal layer 32 and the LC medium 36. The layer 54 is preferably a silicon dioxide film and the transparent conductive layer 56 preferably comprises ITO. The transparent conductive layer 56 is preferably electrically connected to the reflecting metal layer 32 through a via hole 58. Preferably, the width of the via hole 58 is approximately the same as the thickness of the transparent conductive layer 56. For a given wavelength of incident light impinging upon the cell, the thicknesses of the layers 54 and 56 can be optimized to achieve higher reflectivity. For example, a silicon dioxide layer 54 and ITO layer 56 may be formed with a thickness of about 79 nm and 72 nm, respectively. In the alternative, the ITO layer 56 may be replaced with an non-conductive insulating transparent film with a high index of refraction such as SiN or $TiO_2$. In this case, the via hole 58 may be eliminated.

Figure 7:
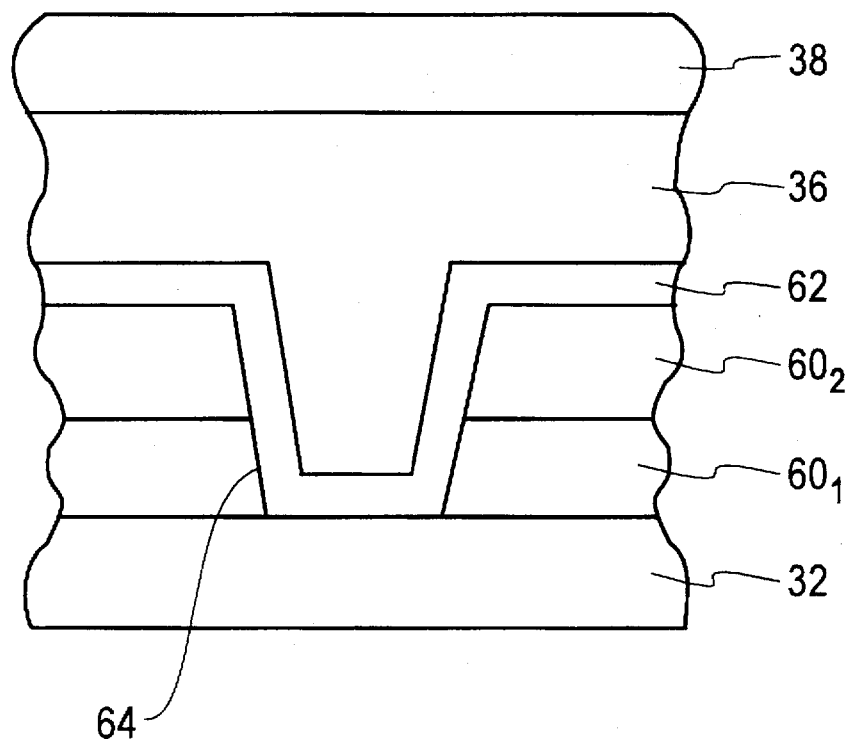
FIG. 7 is a cross-sectional view of the reflective-type AMLCD according to the present invention illustrating the reflecting metal layer and layers adjacent thereto.

As shown in FIG. 7, two or more layers of dielectric material (two shown $60_1, 60_2$) and an transparent conductive layer 62 are formed on the reflecting metal layer 32 and disposed between the reflecting metal layer 32 and the LC medium 36. Preferably, the first dielectric layer $60_1$ disposed adjacent to the reflecting metal layer 32 has a low index of refraction and the second dielectric layer $60_2$ has a high index of refraction. Additional pairs of dielectric layers with alternating low and high index of refraction may formed on top of the first pair of dielectric films $60_1, 60_2$. The number of pairs of such dielectric films can be an integer number chosen arbitrarily. In order to achieve high reflectivity, the thickness of each dielectric film is chosen to be approximately equivalent to a quarter-wave plate for a given incident light. A more detailed discussion of a quarter-wave plate is set forth in American Institute of Physics Handbook, third edition (1972), McGraw-Hill Company, pp. 6-118 to 6-123, herein incorporated by reference in its entirety. The dielectric material for layers $60_1, 60_2 \ldots$ preferably comprise silicon dioxide film and the transparent conductive layer 62 preferably comprises ITO. The transparent conductive layer 62 is preferably electrically connected to the reflecting metal layer 32 through a via hole 64 through the stack of dielectric layers $60_1, 60_2$. In the alternative, the ITO layer 62 may be replaced with an non-conductive insulating transparent film with a high index of refraction such as SiN or $TiO_2$. In this case, the via hole 64 may be eliminated.

Figure 8:
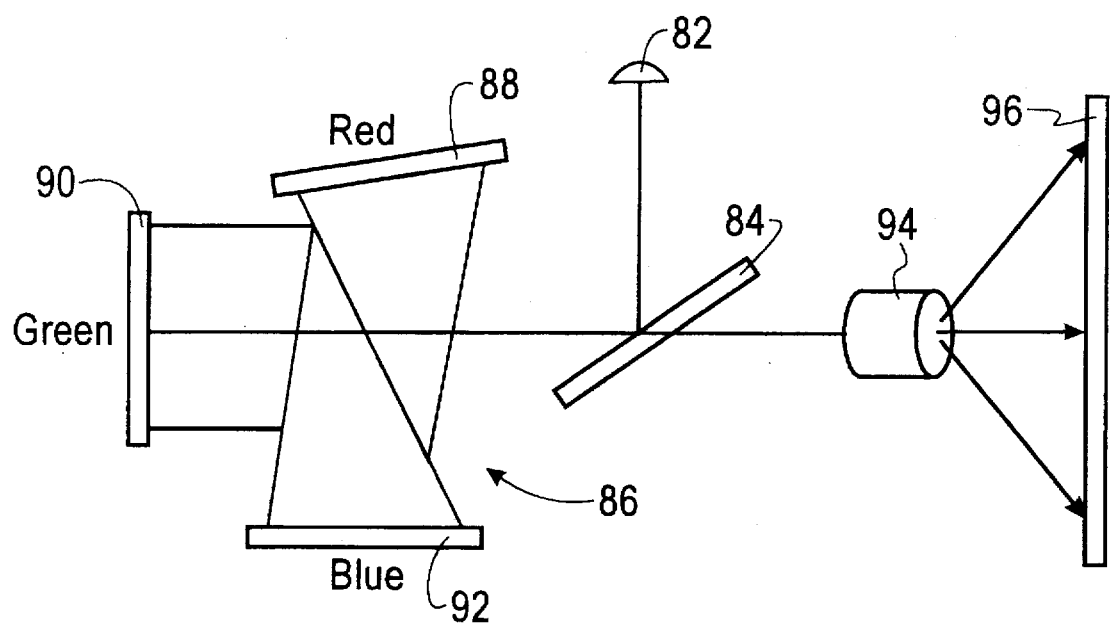
FIG. 8 is a pictorial illustration of a spatial light modulator utilizing the reflective-type AMLCD of the present invention.

The reflective-type liquid AMLCD of the present invention may be used as part of a spatial light modulator. An example of a spatial light modulator is shown in FIG. 8.

After originating from a light source 82 and then being linearly polarized, light is reflected by a polarized beam splitter 84 and enters a color separation prism 86, where the light is split into three primary colors, that is, red (R), green (G), and red (R), which then enter reflective liquid crystal cells 88, 90, 92, respectively. The reflective-type liquid crystal light cell of the present invention is used for the light cells 88,90,92. The brightness of the light is modulated by each reflective-type liquid crystal light valve according to each sub-pixel, and is then reflected and again enters the color separation prism 86. At this stage, the polarization of the out-going light is perpendicular to the original polarization and passes through the polarized beam splitter 84 again and enters a projection lens 94. Therefore, the image output by the reflective-type liquid crystal light cells is enlarged and projected on a screen 96.

Other embodiments of the invention will be apparent to those skilled in the art from consideration of the specification and practice of the invention disclosed herein. It is intended that the specification and examples be considered as examples only, with the true scope of the invention being indicated by the claims.

What is claimed is:

1. A liquid crystal cell for a liquid crystal display device comprising:

a transparent electrode;

a reflective electrode; and a liquid crystal material disposed between said transparent electrode and said reflective electrode;

wherein work functions of said transparent electrode and said reflective electrode are approximately equal and wherein said reflective electrode comprises a transparent conductive layer and a reflecting metal layer.

2. The liquid crystal cell of claim 1, wherein said reflecting metal layer comprises aluminum.

3. The liquid crystal cell of claim 2, wherein said transparent conductive layer comprises ITO.

4. The liquid crystal cell of claim 1, wherein the thickness of said transparent conductive layer is approximately a half-wave plate for a predetermined incident light.

5. The liquid crystal cell of claim 1, wherein said liquid crystal cell is used in a spatial light modulator device.

6. A liquid crystal cell for a liquid crystal display device comprising:

a transparent electrode;

a reflective electrode; and a liquid crystal material disposed between said transparent electrode and said reflective electrode;

wherein work functions of said transparent electrode and said reflective electrode are approximately equal, and wherein said reflective electrode comprises at least one layer of dielectric material disposed between a transparent conductive layer and a reflecting metal layer.

7. The liquid crystal cell of claim 6, wherein said transparent conductive layer comprises ITO.

8. The liquid crystal cell of claim 6, wherein said dielectric material comprises silicon dioxide.

9. The liquid crystal cell of claim 6, wherein the thickness of said at least one layer of dielectric material and said transparent conductive layer is optimized to achieve high reflectivity.

10. The liquid crystal cell of claim 8, wherein said reflective electrode comprises at least one pair of layers of dielectric material.

11. The liquid crystal cell of claim 10, wherein a first layer of said at least one pair of layers of dielectric material has a lower index of refraction with respect to a second layer of said at least one pair of layers of dielectric material.

12. The liquid crystal cell of claim 11, wherein said transparent conductive layer comprises ITO and said dielectric material comprises silicon dioxide.

13. The liquid crystal cell of claim 6, wherein said liquid crystal cell is used in a spatial light modulator device.

* * * * *